(12) United States Patent
Uyttendaele et al.

(10) Patent No.: US 7,142,209 B2
(45) Date of Patent: *Nov. 28, 2006

(54) REAL-TIME RENDERING SYSTEM AND PROCESS FOR INTERACTIVE VIEWPOINT VIDEO THAT WAS GENERATED USING OVERLAPPING IMAGES OF A SCENE CAPTURED FROM VIEWPOINTS FORMING A GRID

(75) Inventors: Matthew Uyttendaele, Seattle, WA (US); Simon Winder, Seattle, WA (US); Charles Zitnick, III, Seattle, WA (US); Richard Szeliski, Redmond, WA (US); Sing Bing Kang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 128 days.

This patent is subject to a terminal disclaimer.

(21) Appl. No.: 11/097,549

(22) Filed: Mar. 31, 2005

(65) Prior Publication Data

US 2006/0028489 A1 Feb. 9, 2006

Related U.S. Application Data

(63) Continuation-in-part of application No. 10/910,088, filed on Aug. 3, 2004.

(51) Int. Cl.
*G06T 15/20* (2006.01)

(52) U.S. Cl. .............. 345/427; 345/629; 345/640; 715/723; 715/757

(58) Field of Classification Search .............. None
See application file for complete search history.

(56) References Cited

U.S. PATENT DOCUMENTS

| | | | | | |
|---|---|---|---|---|---|
| 5,900,879 | A | * | 5/1999 | Berry et al. ............... | 345/419 |
| 6,215,505 | B1 | * | 4/2001 | Minami et al. ............. | 345/473 |
| 6,271,842 | B1 | * | 8/2001 | Bardon et al. ............. | 715/848 |
| 6,388,669 | B1 | * | 5/2002 | Minami et al. ............. | 345/474 |
| 6,744,434 | B1 | * | 6/2004 | Kindratenko et al. ....... | 345/423 |
| 2004/0196282 | A1 | * | 10/2004 | Oh ............................ | 345/419 |

OTHER PUBLICATIONS

Warren, Joe, Barycentric coordinates for convex polytopes, Technical report, Department of Computer Science, Rice University, 1996.

* cited by examiner

Primary Examiner—Mark Zimmerman
Assistant Examiner—Enrique L. Santiago
(74) Attorney, Agent, or Firm—Lyon & Harr, LLP; Richard T Lyon

(57) ABSTRACT

A system and process for rendering and displaying an interactive viewpoint video is presented in which a user can watch a dynamic scene while manipulating (freezing, slowing down, or reversing) time and changing the viewpoint at will. The ability to interactively control viewpoint while watching a video is an exciting new application for image-based rendering. Because any intermediate view can be synthesized at any time, with the potential for space-time manipulation, this type of video has been dubbed interactive viewpoint video.

20 Claims, 8 Drawing Sheets

REAL-TIME RENDERING SYSTEM AND PROCESS FOR INTERACTIVE VIEWPOINT VIDEO THAT WAS GENERATED USING OVERLAPPING IMAGES OF A SCENE CAPTURED FROM VIEWPOINTS FORMING A GRID

CROSS-REFERENCE TO RELATED APPLICATIONS

This application is a continuation-in-part of a prior application entitled "A Real-Time Rendering System And Process For Interactive Viewpoint Video" which was assigned Ser. No. 10/910,088 and filed Aug. 3, 2004.

BACKGROUND

1. Technical Field

The invention is related to the rendering of video, and more particularly to a system and process for rendering an interactive viewpoint video in which a user can watch a dynamic scene while changing the viewpoint at will.

2. Background Art

For several years now, viewers of TV commercials and feature films have been seeing the "freeze frame" effect used to create the illusion of stopping time and changing the camera viewpoint. The earliest commercials were produced by using a film-based system, which rapidly jumped between different still cameras arrayed along a rail to give the illusion of moving through a frozen slice of time.

When it first appeared, the effect was fresh and looked spectacular, and soon it was being emulated in many productions, the most famous of which is probably the "bullet time" effects seen in the movie entitled "The Matrix". Unfortunately, this effect is a one-time, pre-planned affair. The viewpoint trajectory is planned ahead of time, and many man hours are expended to produce the desired interpolated views. Newer systems are based on video camera arrays, but still rely on having many cameras to avoid software view interpolation.

Thus, existing systems would not allow a user to interactively change to any desired viewpoint while watching a dynamic image-based scene. Most of the work on image-based rendering (IBR) in the past involves rendering static scenes, with two of the best-known techniques being Light Field Rendering [10] and the Lumigraph [6]. Their success in high quality rendering stems from the use of a large number of sampled images and has inspired a large body of work in the field. One exciting potential extension of this groundbreaking work involves interactively controlling viewpoint while watching a video. The ability of a user to interactively control the viewpoint of a video enhances the viewing experience considerably, enabling such diverse applications as new viewpoint instant replays, changing the point of view in dramas, and creating "freeze frame" visual effects at will.

However, extending IBR to dynamic scenes is not trivial because of the difficulty (and cost) of synchronizing so many cameras as well as acquiring and storing the images. Not only are there significant hurdles to overcome in capturing, representing, and rendering dynamic scenes from multiple points of view, but being able to do this interactively provides a significant further complication. To date attempts to realize this goal have not been very satisfactory.

In regard to the video-based rendering aspects of an interactive viewpoint video system, one of the earliest attempts at capturing and rendering dynamic scenes was Kanade et al.'s Virtualized Reality system [9], which involved 51 cameras arranged around a 5-meter geodesic dome. The resolution of each camera is 512×512 and the capture rate is 30 fps. They extract a global surface representation at each time frame, using a form of voxel coloring [13] based on the scene flow equation [16]. Unfortunately, the results look unrealistic because of low resolution, matching errors, and improper handling of object boundaries.

Carranza et al. [3] used seven synchronized cameras distributed around a room looking towards its center to capture 3D human motion. Each camera is at CIF resolution (320×240) and captures at 15 fps. They use a 3D human model as a prior to compute 3D shape at each time frame.

Yang et al. [18] designed an 8×8 grid of cameras (each 320×240) for capturing a dynamic scene. Instead of storing and rendering the data, they transmit only the rays necessary to compose the desired virtual view. In their system, the cameras are not genlocked; instead, they rely on internal clocks across six PCs. The camera capture rate is 15 fps, and the interactive viewing rate is 18 fps.

As a proof of concept for storing dynamic light fields, Wilburn et al. [17] demonstrated that it is possible to synchronize six cameras (640×480 at 30 fps), and compress and store all the image data in real time. They have since hooked up 128 cameras.

A lot of images are required for realistic rendering if the scene geometry is either unknown or known to only a rough approximation. If geometry is known accurately, it is possible to reduce the requirement for images substantially [6]. One practical way of extracting the scene geometry is through stereo, and a lot of stereo algorithms have been proposed for static scenes [12]. However, there have been a few attempts at employing stereo techniques with dynamic scenes. As part of the Virtualized Reality work [9], Vedula et al. [16] proposed an algorithm for extracting 3D motion (i.e., correspondence between scene shape across time) using 2D optical flow and 3D scene shape. In their approach, they use a voting scheme similar to voxel coloring [13], where the measure used is how well a hypothesized voxel location fits the 3D flow equation.

Zhang and Kambhamettu [19] also integrated 3D scene flow and structure in their framework. Their 3D affine motion model is used locally, with spatial regularization, and discontinuities are preserved using color segmentation. Tao et al. [15] assume the scene is piecewise planar. They also assume constant velocity for each planar patch in order to constrain the dynamic depth map estimation.

In a more ambitious effort, Carceroni and Kutulakos [2] recover piecewise continuous geometry and reflectance (Phong model) under non-rigid motion with known lighting positions. They discretize the space into surface elements ("surfels"), and perform a search over location, orientation, and reflectance parameter to maximize agreement with the observed images.

In an interesting twist to the conventional local window matching, Zhang et al. [20] use matching windows that straddle space and time. The advantage of this method is that there is less dependence on brightness constancy over time.

Active rangefinding techniques have also been applied to moving scenes. Hall-Holt and Rusinkiewicz [7] use projected boundary-coded stripe patterns that vary over time. There is also a commercial system on the market called ZCam™ manufactured by 3DV Systems of Israel, which is a range sensing video camera add-on used in conjunction with a broadcast video camera. However, it is an expensive system, and provides single viewpoint depth only, which makes it less suitable for multiple view-point video.

However, despite all the advances in stereo and image-based rendering, it is still very difficult to interactively render high-quality, high resolution views of dynamic scenes. The present invention tackles this problem in a cost efficient manner.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for rendering and displaying an interactive viewpoint video in which a user can watch a dynamic scene while manipulating (freezing, slowing down, or reversing) time and changing the viewpoint at will. The ability to interactively control viewpoint while watching a video is an exciting new application for image-based rendering. Because any intermediate view can be synthesized at any time, with the potential for space-time manipulation, this type of video has been dubbed interactive viewpoint video.

Interactive viewpoint video is generated using a bank of video cameras for capturing multiple video streams and synchronization equipment for synchronizing the video streams. Collectively, the video streams can be characterized as being sequential groups of contemporaneously captured video frames each depicting a different viewpoint of a scene. The video cameras are arranged in a rectangular or triangular grid with regular or irregular camera placement, such that each camera views the scene from a different viewpoint. The field of view of each camera overlaps the field of view of any adjacent camera by a prescribed amount. This camera grid arrangement results in the user being able to view the scene from any vantage point on a surface formed by the camera viewpoints, even if it does not coincide with one of the camera positions. Thus, it would appear to users as if they can pan and tilt across the scene, bounded only by the edges of the grid.

The rendering and displaying system that is used to play the interactive viewpoint video has a user interface sub-system for inputting user viewpoint selections and displaying rendered interactive viewpoint video frames to the user. To this end, the system includes an input device of some type that is employed by the user to input viewpoint selections on an ongoing basis, and a display device used to display the rendered interactive viewpoint video frames to the user. In addition, the user interface sub-system can include a graphic user interface that allows the user to graphically indicate the viewpoint via the input device.

The rendering and displaying system further includes a computing device on which a rendering program is run. This rendering program is used to render each frame of the interactive viewpoint video and generally includes a selective decoding module and a rendering module. The selective decoding module decodes data in the form of layered video frames, as well as calibration data. The calibration data provides location and viewpoint information for each video camera used to capture the data associated with the aforementioned layered representations of video frames. The layered representation data and calibration data may be input by the decoding module in the form of an interactive viewpoint video file, and may also be compressed. If so, the decoding module is tasked with decompressing the data. In order to speed up processing and provide real time rendering, just the data needed to render the desired view are decoded by the decoding module. The particular data needed are identified by the aforementioned rendering module.

In general, for each interactive viewpoint video frame rendered, the rendering module first identifies a current user-specified viewpoint. Next, the frame or frames that are needed to render the current frame of the interactive viewpoint video from the identified viewpoint are identified from the group of contemporaneous frames associated with the current temporal portion of the video being played. This generally entails using the calibration data to determine the viewpoints associated with each frame in the current group, and then determining if the current user-selected viewpoint coincides with one of the frame viewpoints or falls between the viewpoints of the frames. When the identified viewpoint coincides with a viewpoint of one of the video frames, that frame is identified as the frame needed to render the scene. However, when the identified viewpoint falls between the viewpoints of the video frames, a prescribed number of frames whose viewpoint most closely neighbors the identified viewpoint are identified as the frames needed to render the scene. More particularly, the closest three or four frames are found. If the identified viewpoint falls on a line connecting two of these frames, only those two frames are identified as the frames needed to render the scene. However, if the identified viewpoint falls within the region created by connecting the viewpoints of the closest frames (i.e., a triangular region in the case where three neighboring frames are used and a quadrilateral region if four neighboring frames are used), then all of these closest frames are identified as the ones needed to render the scene.

Once the required frame or frames are identified, the layered representations corresponding to those frames are obtained. This, at a minimum, entails extracting just the needed frame data from the interactive viewpoint video data. If the video data is contained in a file, it will typically need to be decoded. A selective decoding module of the rendering program can be employed for this purpose. Further, if the layered frame data have been compressed, the decoder module is responsible for decompressing the portion of the video data needed to recover the particular frames required to render the scene from the desired viewpoint. The layered representations of each frame include a main layer made up of background color and background disparity values of pixels found within pre-determined sized areas in the frame surrounding pixels exhibiting depth discontinuities exceeding a prescribed threshold, as well as color and disparity values of pixels found outside said areas. In addition, there is a boundary layer having foreground color, foreground disparity and alpha values of pixels found within the aforementioned depth discontinuity areas.

The decoded frame data are used to render the next frame of the interactive viewpoint video from the viewpoint currently specified by the user. This is a straightforward process if the specified viewpoint coincides with the viewpoint associated with a decoded frame. More particularly, it involves compositing the boundary layer over the main layer using the alpha values from the boundary layer. However, if the desired viewpoint falls between frames, the rendering process is more involved. In one embodiment of the rendering process, this entails, for each of the input frames in turn, projecting the main and boundary layers of the frame to a virtual view corresponding to the current user-specified viewpoint. In addition, for each pixel in each rendered frame an alpha-blended color $C_f$ is computed. The color $C_f$ is computed for the corresponding pixel of the main and boundary layers associated with the frame under consideration using the equation $C_f = C_{boundary\ f} \alpha_{color\ f} + C_{main\ f}(1-\alpha_{color\ f})$, where $\alpha_{color\ f} = 1 + \alpha_{main\ f}(\alpha_{boundary\ f} - 1)$ if the corresponding depth of the boundary layer at that pixel is less than or equal to the depth of the main layer and $\alpha_{color\ f} = 0$ otherwise. The value $C_{boundary\ f}$ is the color of the boundary layer pixel of the frame under consideration, $\alpha_{boundary\ f}$ is the alpha value of the boundary layer pixel of the frame under consideration and $C_{main\ f}$ is the color of the main layer pixel of the frame. It is noted that the alpha value of the boundary layer pixels falling outside the depth discontinuity areas is assumed to be zero, the alpha value of the main layer pixels outside the depth discontinuity areas is assumed to be one, and the alpha value of the main layer pixels inside the depth discontinuity areas is assumed to be zero.

Once the layer pairs of the input frames have been composited into the new virtual viewpoint, they are combined. To this end, weights are assigned to each composited layer pair. This weight is in direct proportion to how close the viewpoint associated with the layers used to create the composited layer pair is to the current user-specified viewpoint. Once the weights have been established, the composited layer pairs are blended based on their assigned weights.

In a variation of the blending procedure, correspondingly located pixels of the composited layer pairs are blended based on not only the assigned weights, but also based on their relative disparity values. More particularly, the color value of the pixel having the smaller disparity value is assigned to the corresponding pixel location in the frame of the interactive viewpoint video being rendered, whenever one of the pixels in the pair exhibits a disparity value that is less than the other by more than a prescribed tolerance (e.g., 4 levels). However, if the pair of pixels exhibit disparity values that differ by an amount that is equal to or less than the prescribed tolerance, then the color values of the pixels are blended in accordance with the weights assigned to each composited layer pair and assigned to the corresponding pixel location in the frame of the interactive viewpoint video.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 8(a) represents the rendered main layer of one camera view with the areas associated with depth discontinuities erased. FIG. 8(b) represents the composited main and boundary layers of this first view, whereas FIG. 8(c) represents the composited layers of the second view. Finally, FIG. 8(d) represents the final blended frame of the interactive viewpoint video.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Interactive Viewpoint Video

The present rendering system and process renders and displays dynamic scenes with interactive viewpoint control, in real time, from interactive viewpoint video data. In general, interactive viewpoint video is video in which a user can watch a dynamic scene while manipulating (freezing, slowing down, or reversing) time and changing the viewpoint at will. This video is generated using a relatively small number of cameras to simultaneously capture multiple views of a scene from different viewpoints to produce a set of contemporaneous frames of the video. This is done on a continuing basis to produce a sequence of these frame sets, which are then characterized using unique two-layer frame representations, to form the video. While the generation of the interactive viewpoint video is beyond the scope of the present rendering system and process, it is the subject of a co-pending application entitled "Interactive Viewpoint Video System And Process Employing Overlapping Images Of A Scene Captured From Viewpoints Forming A Grid", which was filed on Mar. 31, 2005 and assigned Ser. No. 11/097,542.

In general, the co-pending application describes an interactive viewpoint video capture system which includes a bank of video cameras, arranged in a grid. In addition, the cameras have a convergent configuration such that each points generally toward the same target object or area in a scene with each camera's field of view overlapping the field of view of the adjacent camera or cameras by a prescribed amount (e.g., 30 degrees horizontal field of view per camera with relative rotation of 4–8 degrees between two adjacent cameras). The orientation of the cameras in relation to the target object or area can vary depending on the desired results. In other words, the distance each camera is away from the target object or area can vary. Thus, the grid of cameras need not be planar.

Figures 3A, 3B:
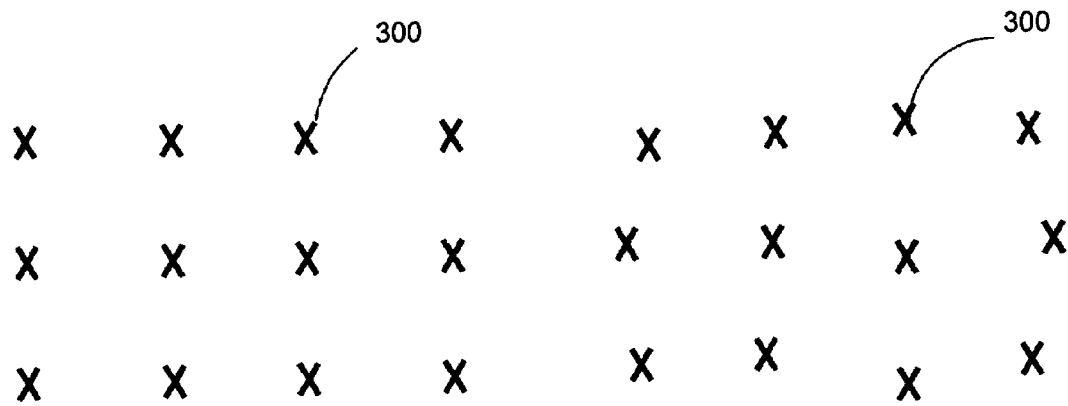
FIGS. 3(a)–(d) are diagrams showing a regular rectangular grid in FIG. 3(a), an irregular rectangular grid in FIG. 3(b), a regular triangular grid in FIG. 3(c) and an irregular triangular grid in FIG. 3(d).
Figures 3C, 3D:
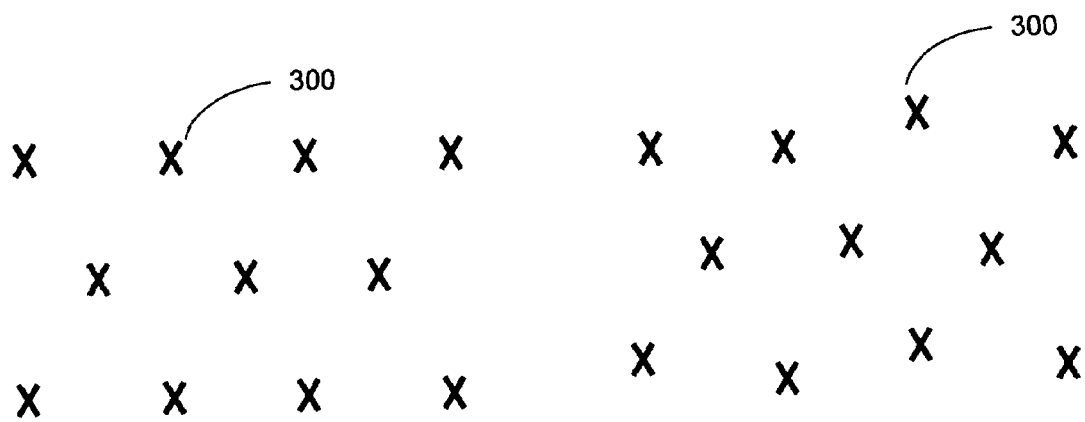

Further, the grid of cameras can be rectangular or triangular, and the placement pattern can be regular or irregular. For example, FIG. 3(a) illustrates a rectangular configuration with a regular placement pattern. In other words, when looking toward the center of the grid, the camera viewpoints 300 indicated by the X's appear to be lined up in straight columns and rows. FIG. 3(b) exemplifies a rectangular configuration with an irregular placement pattern. In this case, when looking toward the center of the grid, the viewpoints 300 are generally in columns and rows, but each viewpoint may be skewed so that they do not line up perfectly. FIG. 3(c) illustrates a triangular configuration with a regular placement pattern. Here, when looking toward the center of the grid, the viewpoints 300 appear to be lined up in horizontal rows, but diagonal columns. FIG. 3(d) exemplifies a triangular configuration with an irregular placement pattern. In this case, when looking toward the center of the grid, the viewpoints 300 are generally in the aforementioned horizontal row and diagonal column pattern, but each may be skewed so that they do not line up perfectly. It is noted that the number of cameras shown in the figures is arbitrary, and there can be more or less as desired.

This foregoing camera grid arrangement results in the user being able to view the scene from any vantage point along a surface connecting the camera viewpoints. Thus, it would appear to users as if they can pan and tilt across the scene, bounded only by the edges of the grid.

Another key feature of the interactive viewpoint video capture system is the real-time acquisition of synchronized video streams from the cameras. To accomplish this task, equipment capable of receiving and synchronizing the individual feeds from the cameras is advantageous, as is equipment for storing the synchronized video stream data. For example, real-time synchronization and storage of all the input videos can be handled by a series of concentrator units and a bank of hard drives. Each concentrator synchronizes the feed from a prescribed number of cameras (e.g., 4) and pipes the uncompressed video streams into the bank of hard drives through a fiber optic cable. The concentrators are synchronized (e.g., via a FireWire cable) to ensure all the video feeds are synchronous. In an alternative realization of the system, each camera could have its own recording device such as DV tape, VHS tape, etc. The video may then be transferred to hard disk after recording.

In addition to the capture and storing of video streams, the interactive viewpoint video capture system also includes camera calibration program. The cameras are calibrated before every capture session to obtain all the camera attributes necessary for 3D reconstruction. These attributes including both geometric parameters (e.g., intrinsic and extrinsic camera parameters) and photometric parameters (e.g., exposure, white balance, vignetting). The camera parameters are stored and provided, along with the video streams, to the interactive viewpoint video generation program that will be described shortly.

The aforementioned two layer representations of each frame include a main layer and a boundary layer. The main layer has pixels exhibiting background colors and background disparities associated with correspondingly located pixels of depth discontinuity areas of the frame being represented, as well as pixels exhibiting colors and disparities associated with correspondingly located pixels of the frame not found in these depth discontinuity areas. The boundary layer is made up of pixels exhibiting foreground colors, foreground disparities and alpha values associated with the correspondingly located pixels of the depth discontinuity areas in the frame. The depth discontinuity areas correspond to prescribed sized areas surrounding depth discontinuities found in the frame.

2.0 Interactive Viewpoint Video Rendering

A key advantage of the present interactive viewpoint video rendering system and process is that view-interpolated frames of the highest possible quality are provided to enhance the viewing experience, even though relatively few camera views are employed in generating the video data. This is not easily achieved. One approach, as suggested in the Light Field Rendering paper [10], is to simply resample rays based only on the relative positions of the input and virtual cameras. As demonstrated in the Lumigraph [6] and subsequent work, however, using a 3D impostor or proxy for the scene geometry can greatly improve the quality of the interpolated views. Another approach is to create a single texture-mapped 3D model [9], but this generally produces inferior results to using multiple reference views.

The present system and process employs the geometry-assisted image-based rendering approach, which requires a 3D proxy. One possibility is to use a single global polyhedral model, as in the Lumigraph and Unstructured Lumigraph reference [1]. Another possibility is to use per-pixel depth, as in Layered Depth Images [14], offset depth maps in Facade [4], or sprites with depth [14]. In general, however, using different local geometric proxies for each reference view [11, 5, 8] produces higher quality results, so that approach is adopted.

The following sections will present details of the present rendering system and process. A computing environment suitable for implementing the present invention is presented first. This is followed by a more detailed description of the rendering system and process.

2.1 The Computing Environment

Figure 1:
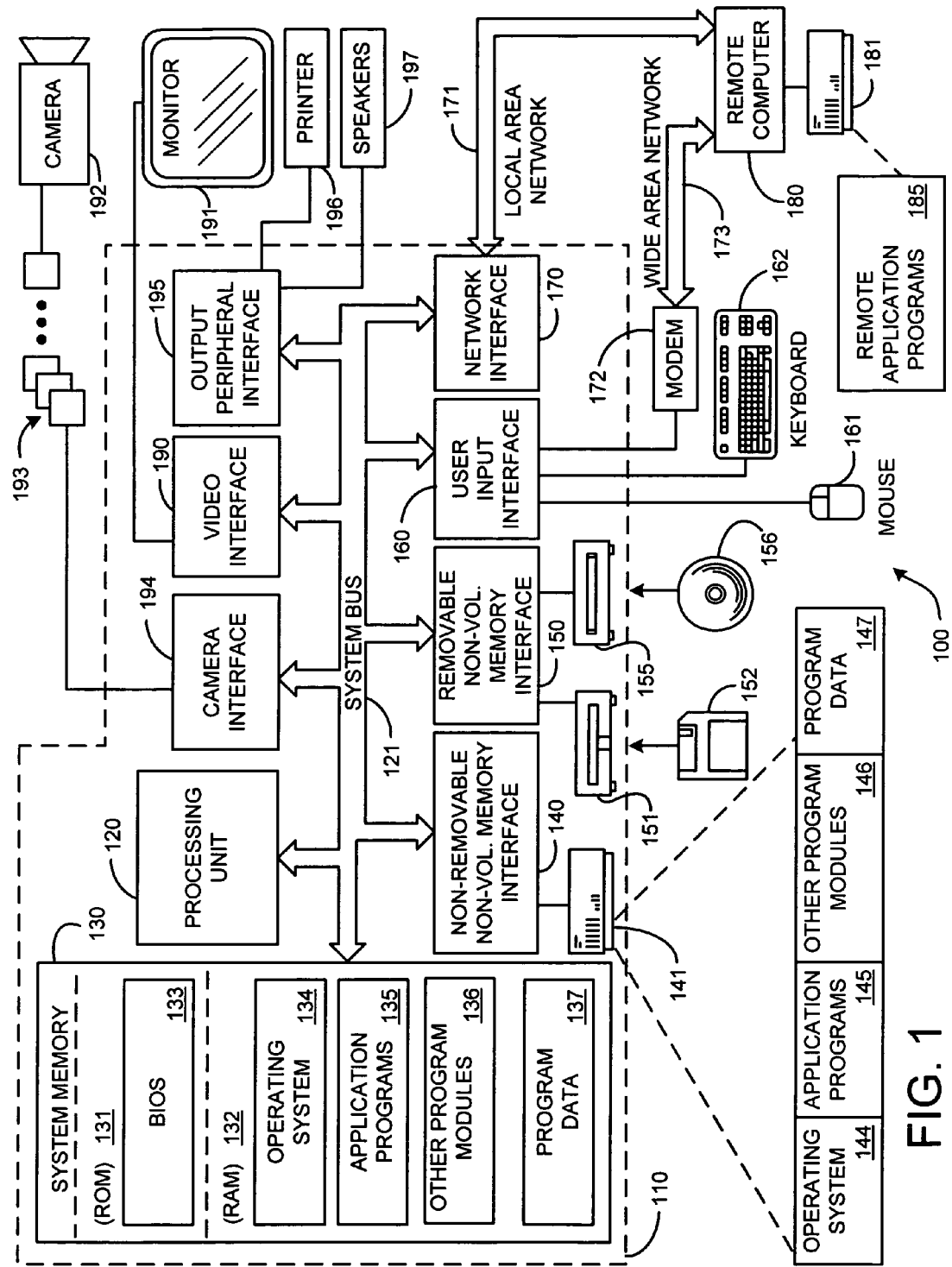
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, main frame computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the interactive viewpoint video rendering system program architecture and process.

2.2 Interactive Viewpoint Video Rendering Program Architecture

Figure 2:
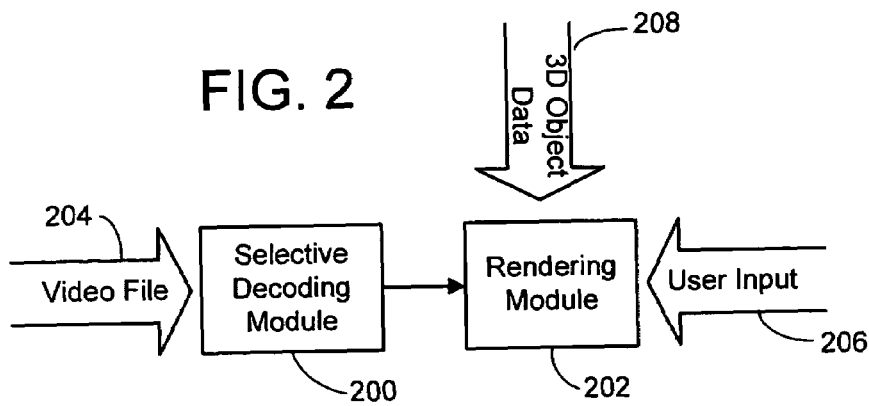
FIG. 2 is a block diagram showing the general computer program module architecture for one embodiment of the interactive viewpoint video rendering program according to the present invention.

Referring to FIG. 2, an interactive viewpoint video file 204 is first fed into a selective decoding module 200. The video file contains encoded versions of the aforementioned two-layer video frame representations as well as calibration data. The calibration data includes the location and viewpoint information for each of the video cameras used to capture the scene associated with the video being rendered. Given this information the locations of the camera viewpoints can be computed. Generally, the selective decoding module 200 decodes just those portions of the incoming file that are needed to render a current frame of the video from a vantage point selected by a user viewing the video. More particularly, the module 200 decodes the portions of the file identified by the rendering module 202 (which will be described shortly) to recover the layered video frame data associated with the particular video frame or frames needed to render the scene from the desired viewpoint. In this way, the minimum amount of data possible must be decoded, thereby speeding up the process and providing real-time rendering capability.

The decoded layered frame data is provided to the rendering module 202. Generally, this module 202 takes the frame data and renders a view of the scene for the current portion of the video being viewed by the user from a vantage point specified by the user. This involves first obtaining the current user input 206 and then generating the desired view.

2.2.1 Selective Decoding Module

The purpose of the selective decoding module is to decode only the information needed to render the scene captured in the video from the current user-selected vantage point. In essence this entails decoding the frame or frames from the group of contemporaneously capture frames associated with the current part of the video being played that must be decoded in order to obtain the layered video frame data needed to render a view of the scene depicted in the current portion of the video from a particular user selected vantage point. Should this vantage point coincide with the view of the scene captured by one of the cameras, then only the data associated with that frame need be decoded. However, if the desired viewpoint falls somewhere between the camera views, then the frame data associated with adjacent camera views must be decoded in order to render the scene from the desired viewpoint.

The particular frame or frames needed to render the scene from the desired vantage point is identified by the rendering module (which will be described next). Once identified, the layered video frame data associated with the identified frame or frames is decoded using the appropriate decoding technique applicable to the type of compression (if any) and encoding schemes employed in creating the interactive viewpoint video file.

In addition to the decoding of frame data from the interactive viewpoint video file, the decoding module also decodes the aforementioned camera calibration data. This data could be found in the file header or as metadata.

2.2.2 Rendering Module

It is the job of the rendering module to first process user input concerning the viewpoint that is desired for the scene to be rendered, and to identify the frame or frames from the group of contemporaneously capture frames associated with the current temporal portion of the video that are needed to render the desired view. In order to accomplish this task, the rendering module is initialized with the aforementioned camera calibration data contained in the interactive viewpoint video file. This calibration data includes the location and viewpoint information for each of the video cameras used to capture the scene associated with the video being viewed. Given this information the rendering module computes the locations of the camera viewpoints. The user is able to specify any viewpoint on a surface connecting the camera viewpoints, bounded only by the edges of the previously-described viewpoint grid.

As discussed above, the selected viewpoint can coincide with the view of the scene captured by one of the cameras. In such a case only the "current" frame associated with that camera is identified as being needed to render the desired view. However, the usual case will be that the viewpoint falls between the viewpoints of the cameras. In this latter case, the rendering module identifies a prescribed number of frames whose viewpoint most closely neighbors the identified viewpoint as the frames needed to render the scene. More particularly, in one embodiment of the rendering module, the closest three frames are found, and in an alternate embodiment the closest four frames are found. In either embodiment, if the identified viewpoint falls on a line connecting two of the frames, only those two frames are identified as the frames needed to render the scene. However, if the identified viewpoint falls within the region created by connecting the viewpoints of the closest frames (i.e., a triangular region in the case where three neighboring frames are used and a quadrilateral region if four neighboring frames are used), then all of the closest frames are identified as the ones needed to render the scene.

As for the user input, this information can be obtained in any appropriate conventional manner, such as via a user interface of some type used to input and process user viewpoint selections. For example, this interface can include a graphics user interface (GUI) that is presented to the user on a display device (e.g., computer monitor, display screen, 3D goggles, among others). This GUI would include some graphic arrangement that allows the user to indicate the viewpoint, among the possible viewpoints, from which he or she wants to view the scene captured in the video for the current portion of the video being rendered. The user can change the desired viewpoint as the video plays as well. These selections would be made by the user interfacing with the GUI using any standard input device (e.g., mouse, joystick, eye tracking device, among others).

Once the frame or frames needed to render the desired view have been identified, the rendering module directs-the selective decoding module to decode the needed frame data. The frame data output of the selective decoding module consists of two layers with a total of five data planes for each frame provided: the main layer color, main layer disparity, boundary layer alpha matte, boundary layer color, and boundary layer disparity. In the case where the desired viewpoint coincides with one of the camera viewpoints, only the main layer and boundary layer data planes of that camera are used to reconstruct the scene. However, in the case where the desired viewpoint falls between the camera viewpoints, the main layer and boundary layer data planes from all the specified views are needed to reconstruct the scene. The details on how the desired view can be rendered will be described shortly. Once the desired view is rendered it is displayed to the user in the manner appropriate to the display device involved.

Figure 4:
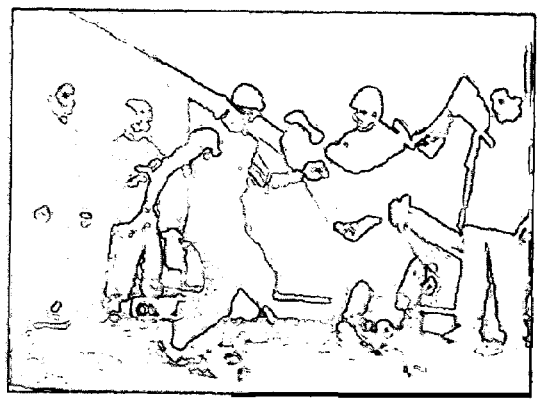
FIG. 4 is an image showing a frame from an interactive viewpoint video created in accordance with the present invention, into which an extra copy of a breakdancer has been inserted.

It is also possible for the rendering module to introduce synthesized elements into the rendered scenes. Thus, in one embodiment of the rendering module (as shown in FIG. 2), 3D object data 208 is input into the rendering module for incorporation into the frame being currently rendered. In one embodiment, this input would include the data necessary to render an animated object or objects from a viewpoint corresponding to the selected viewpoint and locating information for incorporating the object(s) in a pre-established position within the frame being rendered. The object(s) could change shape over time (i.e., so as to have a different appearance in different ones of the rendered frames) or have a static appearance. Further, the position in the rendered frame where the object(s) are incorporated can change with time (i.e., so as to have a different location in different ones of the rendered frames) or can be located in the same place in each successive rendered frame. Image-based objects can also be inserted into the scene during the rendering process. For example, FIG. 4 shows a frame from an interactive viewpoint video created in accordance with the present invention, into which an extra copy of a break-dancer has been inserted. This effect was achieved by first "pulling" a matte of the dancer using a depth threshold and then inserting the pulled sprite into the original video using a standard z-buffering technique.

It is noted that the foregoing rendering architecture can be implemented using graphics processing units (GPU), software rendering techniques, or both. However, if processing solely using the central processing unit (CPU) imposes limitations that would preclude real-time interactive rendering, then the use of a GPU, or a combination of GPU and CPU, is desirable in order to achieve this goal. This is because recent advances in the programmability of GPUs has made it possible to render directly from the output of a decoder without going back to a CPU for any additional processing, thereby increasing the processing speed significantly and making real-time rendering more feasible.

2.2.2 Interactive Viewpoint Video Rendering Process

Figure 5:
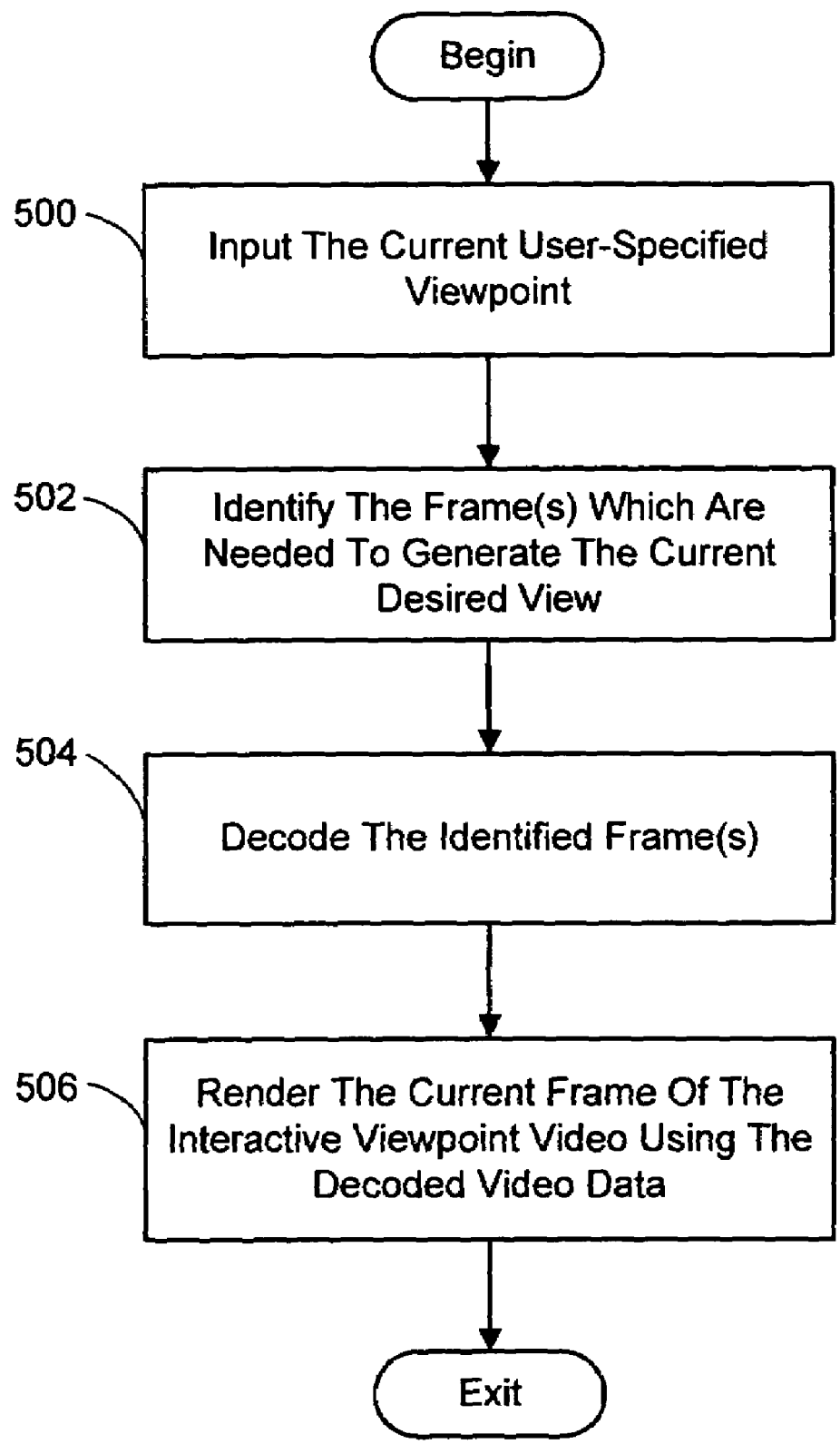
FIG. 5 is a flow chart diagramming the overall interactive viewpoint video rendering process according to the present invention.

In general, the foregoing rendering program architecture can be employed to perform the following process to render the interactive viewpoint video as shown in FIG. 5. Generally, for each frame of the video rendered, the current user-specified viewpoint is first input (process action 500). However, it is noted that instead of inputting the viewpoint each time a new frame of the video is rendered, only changes in the specified viewpoint could be input. In this case, unless a change in viewpoint has been received, it would be assumed the last-specified viewpoint is still valid and would be used in rendering the current frame of the video.

Once the user-specified viewpoint is established, the next process action 502 is to identify the frame or frames from the group of contemporaneously captured input frames associated with the current frame of the video being rendered, which are needed to generate the desired view. The identified frame or frames are then decoded (process action 504).

Next, the current frame of the interactive viewpoint video is produced using the decoded video data (process action 506). This frame will depict the scene associated with the current temporal portion of the video as seen from the viewpoint currently specified by the user. This may require synthesizing the frame if the desired viewpoint falls between the viewpoints of the cameras used to capture the scene. It is noted that the foregoing process can optionally be modified to also insert computer-generated or image-based objects into the scene during the rendering process as described previously, although this action is not shown in FIG. 5.

In cases where the user-specified viewpoint coincides with one of the camera views, the process used to produce the current frame of the interactive viewpoint video is straightforward and conventional. Essentially, the layers of the coinciding camera view are converted to textured meshes as will be described shortly in connection with rendering views that are between the viewpoints of two of the cameras. The boundary layer mesh is then composited over the main layer mesh based on the alpha values of the boundary layer. The result is the finalized frame of the video, which is ready for display to the user.

In cases where the user-specified viewpoint falls between camera views, the rendering process is more complex. In generally, it involves first projecting the various layers of the frames needed to render the user-specified view to the associated virtual viewpoint. This can be accomplished using conventional methods and the camera calibration data provided in the interactive viewpoint video file. Once projected, the layers are combined to produce the final frame. There are various ways that this can be accomplished as will now be described.

Figure 6A:
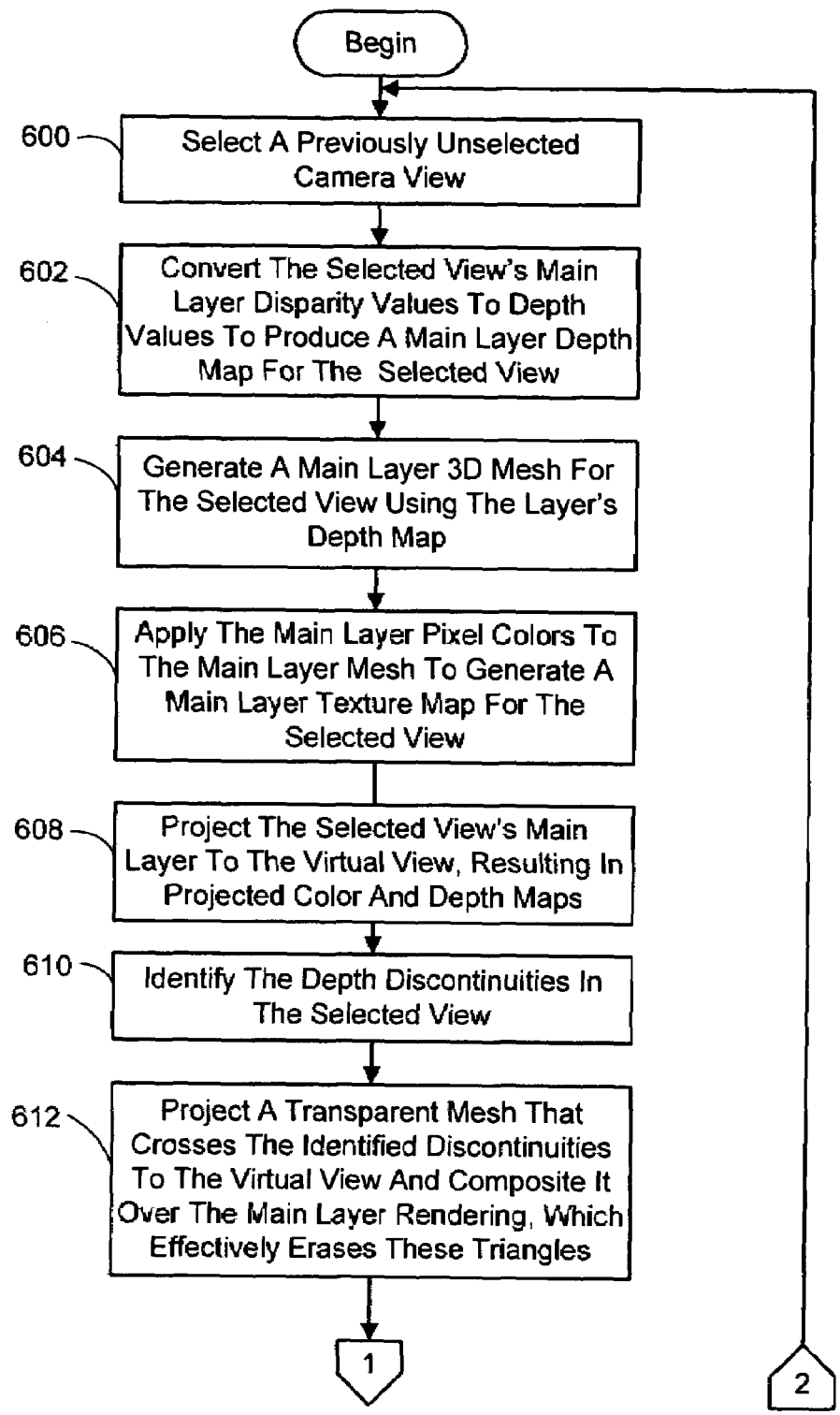
FIGS. 6A–B are a flow chart diagramming one embodiment of the rendering portion of the interactive viewpoint video rendering process of FIG. 5 where data from two camera viewpoints is required to render a view of the scene from the user specified viewpoint, and where the main and boundary layers from the same camera view are projected and composited, and then the composited layers associated with each of the camera views are blended.
Figure 6B:
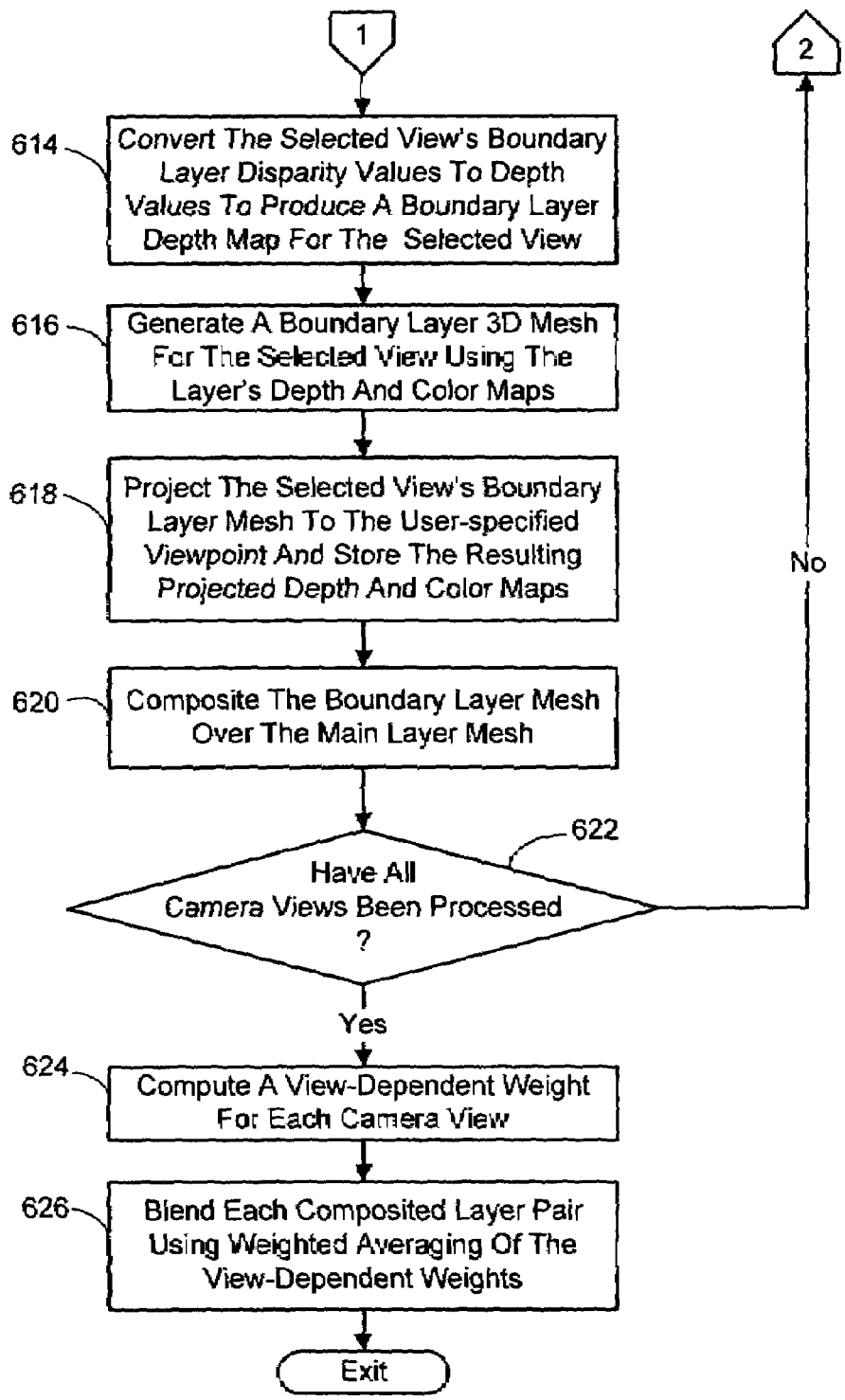

In one embodiment of the present rendering process where data from two camera viewpoints is required to render a view of the scene from the user specified viewpoint, the main and boundary layers from the same camera view are projected and composited, and then the composited layers associated with each of the camera views are blended. More particularly, referring to the process flow diagram of FIGS. 6A–B, one of the camera views involved is selected (process action 600). The selected view's main layer disparity values are then converted to depth values using conventional methods to produce a depth map of the main layer of the frame under consideration (process action 602). It is noted that if depth values are already provided in the layer data rather than disparity values, this first step is skipped. The depth map is then used to generate a 3D mesh (process action 604). To accomplish this task, a vertex shader can be employed. A vertex shader is a programmable unit on current generation GPUs and a simple vertex shader program can be used to generate a 3D mesh from a depth map. However, the conversion from depth map to 3D mesh could also be performed by a more general purpose processor. In essence, the shader takes two input streams, i.e., the X-Y positions and the depth values from the depth map, and produces the mesh. The color of the pixels from the main layer is next applied as a texture map to this mesh (process action 606), again using standard methods. This layer mesh is projected to the virtual view which generates projected color and depth maps (process action 608). To reduce the amount of memory required, the X-Y positions can optionally be stored for only a 256×192 block. The shader is then repeatedly called with different offsets to generate the required 3D mesh and texture coordinates.

Once the mesh is rendered, those triangles crossing depth discontinuities in the frame are erased, Thus, in process action 610, the depth discontinuities are identified by finding regions in the depth map that have a large depth change (e.g., 4 disparity levels). The erasing procedure is then accomplished by projecting transparent (alpha=0) triangles that cross the identified discontinuities and compositing this with the main layer result (process action 612). This effectively erases those regions. The erase action is required because current GPUs are not capable of terminating triangles already in the pipeline. It would be advantageous to design future generations of GPUs to (in addition to processing triangle vertices, which they currently do) also process the triangles themselves. This additional functionality would allow for a more efficient implementation of this system.

Next, the boundary layer is rendered. The boundary layer data is fairly sparse, typically containing about ⅟₆₄th the amount of data as the background. Accordingly, the boundary layer only needs to be rendered where it is non-zero, resulting in a mesh that only has vertices at pixel locations with non-zero alpha values. Thus, the first process action 614 in rendering the boundary layer is to convert the selected view's boundary layer disparity values to depth values to produce a depth map of the boundary layer. Again, it is noted that if depth values are already provided in the layer data rather than disparity values, this step is skipped. The depth map is next converted to a 3D mesh (process action 616). The color of the pixels from the boundary layer is also stored in each vertex, resulting in the 3D position and color of each pixel being stored with the associated mesh vertex. The resulting boundary layer mesh is then projected to the user-specified viewpoint and the resulting color and depth maps are stored (process action 618). The depth values will be needed in the final blending stage as described shortly. The process of generating a 3D mesh from the boundary depths is performed on the CPU. If future generations of GPUs allowed for the creation of triangles, this process could be offloaded to the GPU, resulting in a performance gain.

It is noted that the boundary layer and main layer meshes share vertices in the region near the depth discontinuities. This avoids cracks and aliasing artifacts. In addition, to reduce processing costs, the same CPU pass used to generate the erase mesh of the main layer could be used to generate a boundary layer mesh.

Once both the main layer and boundary layers associated with a camera view under consideration have been rendered as described above and projected to the user-specified viewpoint, the boundary layer mesh is composited over the main layer mesh (process action 620). More particularly, for each pixel in the rendered frame under consideration an alpha-blended color $C_f$ is computed, (where f refers to the frame under consideration). The color $C_f$ is computed for the corresponding pixel of the main and boundary layers associated with the frame using the equation $C_f = C_{boundary\,f} \alpha_{color\,f} + C_{main\,f}(1 - \alpha_{color\,f})$, where $\alpha_{color\,f} = 1 + \alpha_{main\,f}(\alpha_{boundary\,f} - 1)$ if the corresponding depth of the boundary layer at that pixel is less than or equal to the depth of the main layer and $\alpha_{color\,f} = 0$ otherwise. The value $C_{boundary\,f}$ is the color of the boundary layer pixel of the frame under consideration, $\alpha_{boundary\,f}$ is the alpha value of the boundary layer pixel of the frame under consideration and $C_{main\,f}$ is the color of the main layer pixel of the frame under consideration. It is noted that in these calculations the alpha value of the projected boundary layer pixels falling outside the depth discontinuity areas is assumed to be zero, the alpha value of the projected main layer pixels outside the depth discontinuity areas is assumed to be one, and the alpha value of the projected main layer pixels inside the depth discontinuity areas is assumed to be zero. It is then determined if all the camera views involved have been processed (process action 622). If not, process actions 600 through 622 are repeated as indicated in FIG. 6. If, however, all views have been selected and processed, the rendering process continues as described below.

At this point, there is a composited rendering associated with each of the camera viewpoints under consideration. These rendered images are now blended to produce an interactive viewpoint video frame. To this end, weights are computed for each viewpoint involved (process action 624) which are in proportion to how close the camera's viewpoint is from the user-specified viewpoint, i.e., view-dependent weighting [4]. In other words, if the desired viewpoint is closer to a first one of the camera's viewpoints than the other or others, the composited image associated with the first of these cameras is weighted more heavily than the other(s).

Figure 9:
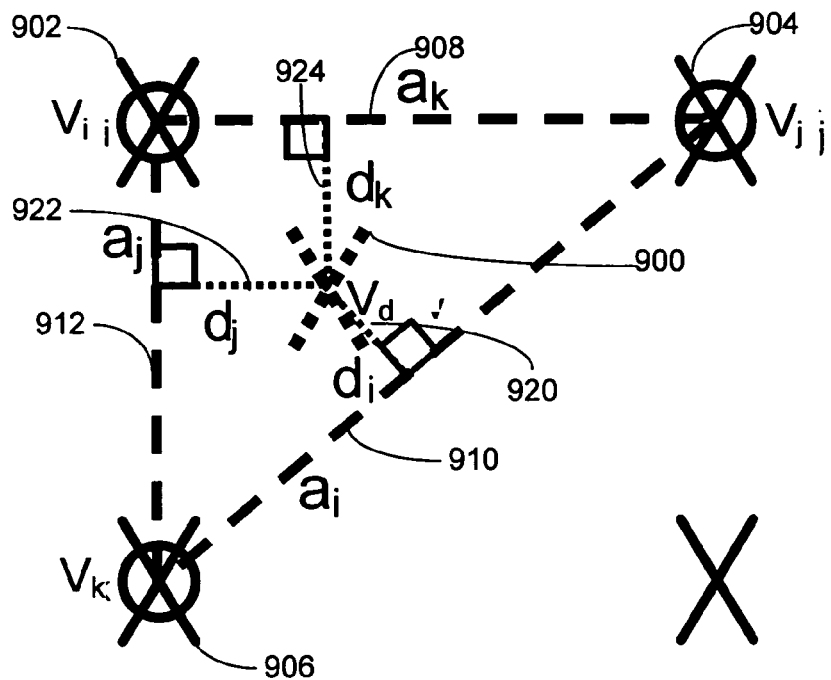
FIG. 9 is a diagram showing the geometry involved with a viewpoint grid where three neighboring viewpoints are employed and the desired viewpoint lies within the region defined by connecting the actual camera viewpoints.

FIG. 9 shows the case where three neighboring viewpoints are employed and the desired viewpoint 900 (shown as the dotted "X" labeled $V_d$) lies within the region defined by connecting the actual camera viewpoints 902, 904, 906 (shown as the solid "Xs" labeled $V_i$, $V_j$ and $V_k$, respectively) with the dashed lines 908, 910, 912. In FIG. 9, the length of lines 910, 912, 908 are labelled $\alpha_i$, $\alpha_j$ and $\alpha_k$, respectively, while the dotted lines 920, 922, 924 labelled $d_i$, $d_j$ and $d_k$, respectively, are perpendicular distances between the desired viewpoint 900 and the dashed lines 908, 910, 912 connecting the actual viewpoints 902, 904, 906.

Figure 10:
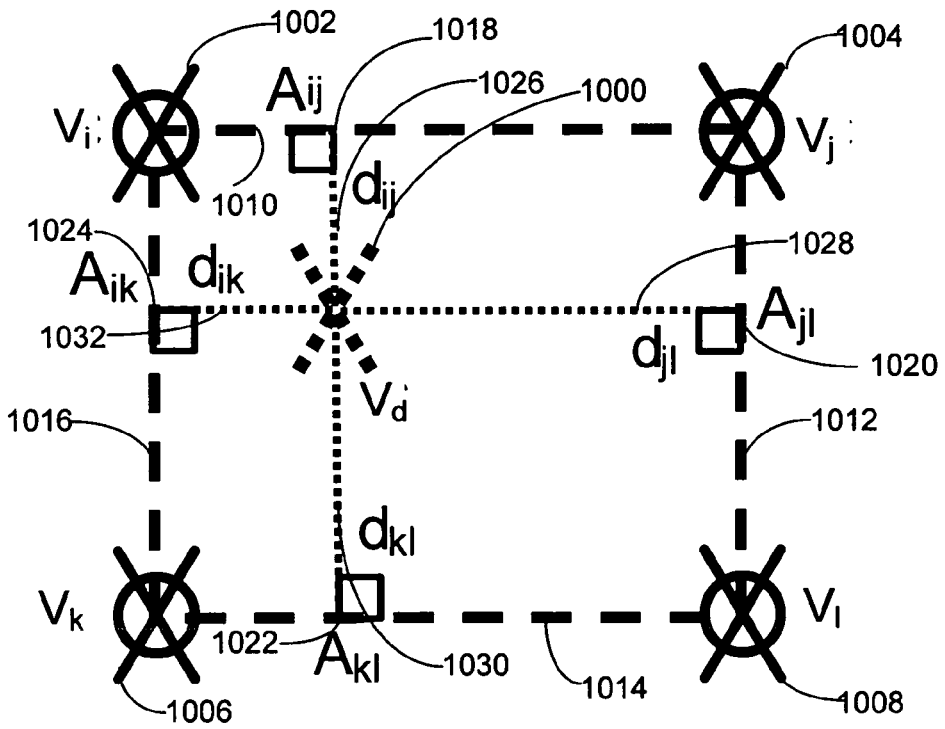
FIG. 10 is a diagram showing the geometry involved with a viewpoint grid where four neighboring viewpoints are employed and the desired viewpoint lies within the region defined by connecting the actual camera viewpoints.

In this "three neighboring viewpoints" configuration, the weights ($w_i$, $w_j$, $w_k$) are computed in one embodiment using barycentric coordinates (e.g., [21]) as follows:

$w_i = a_i d_i / S,$ $w_j = a_j d_j / S,$ and $w_k = a_k d_k / S,$ where $S = a_i d_i + a_j d_j + a_k d_k.$ FIG. 10 shows the case where four neighboring viewpoints are employed and the desired viewpoint 1000 (shown as the dotted "X" labeled $V_d$) lies within the region defined by connecting the actual camera viewpoints 1002, 1004, 1006, 1008 (shown as the solid "Xs" labeled $V_i$, $V_j$, $V_k$ and $V_l$, respectively) with the dashed lines 1010, 1012, 1014, 1016. In FIG. 10, the dotted lines 1026, 1028, 1030, 1032 labeled $d_{ij}$, $d_{jl}$, $d_{kl}$ and $d_{ik}$, respectively, are perpendicular distances between the desired viewpoint 1000 and the dashed lines 1010, 1012, 1014, 1016 connecting the actual viewpoints 1002, 1004, 1006, 1008. Prior to computing the aforementioned weights for this "four neighboring viewpoints" embodiment, a 3×3 matrix transformation H is applied to convert $V_i$, $V_j$, $V_k$ and $V_l$ into the corners of a unit square box. H can be found using the constraints that map $V_i$ to (0,0), $V_j$ to (1,0), $V_k$ to (0,1), and $V_l$ to (1,1). $V_d$ is transformed using H as well. To avoid confusion, the same notation is used to indicate the transformed (i.e., normalized) coordinates and lengths. In the normalized coordinates, points $A_{ij}$ (1018), $A_{jl}$ (1020), $A_{kl}$ (1022) and $A_{ik}$ (1024), are such that line segments $V_dA_{ij}$, $V_dA_{jl}$, $V_dA_{kl}$ and $V_dA_{ik}$ are perpendicular to line segments $V_iV_j$, $V_jV_l$, $V_kV_l$ and $V_iV_k$ respectively. In this normalized "four neighboring viewpoints" configuration, the weights ($w_i$, $w_j$, $w_k$, $w_l$) are computed in one embodiment as:

$$w_i = \text{Area}(V_dA_{jl}V_lA_{kl})/\text{Area}(V_iV_jV_lV_k),$$

$$w_j = \text{Area}(V_dA_{jk}V_kA_{kl})/\text{Area}(V_iV_jV_lV_k),$$

$$w_k = \text{Area}(V_dA_{jk}V_jA_{ij})/\text{Area}(V_iV_jV_lV_k), \text{ and}$$

$$w_l = \text{Area}(V_dA_{ij}V_iA_{ik})/\text{Area}(V_iV_jV_lV_k).$$

This is equivalent to bilinear interpolation in the normalized space. The weights in normalized space are the same as those in the original space.

In the case where the desired viewpoint lies on a line connecting two of the camera viewpoints (for example, dashed line 908 or 1010 connecting viewpoints $V_i$ and $V_j$ in either the three or four neighboring viewpoints configurations of FIGS. 9 and 10, respectively), the weight $w_i$ reduces to:

$$w_i = |V_jV_d|/|V_iV_j|,$$

where | | is the distance of the line segment. The weight $w_j$ is then:

$$w_j = 1 - w_i.$$

The computed weights are next provided to a blending shader, or the equivalent. The blending shader blends each composited layer pair using a weighted averaging of the view-dependent weights (process action 626). More particularly, in the case where three neighboring viewpoints are employed and the desired viewpoint lies within the region defined by connecting the actual camera viewpoints, the blending is based on the computed weights ($w_i$, $w_j$, $w_k$) using the equation:

$$C_f = \frac{(w_i\alpha_iC_i + w_j\alpha_jC_j + w_k\alpha_kC_k)}{(w_i\alpha_i + w_j\alpha_j + w_k\alpha_k)}$$

where $C_f$ is the final color. The alpha values $\alpha_i$, $\alpha_j$ and $\alpha_k$ are computed as $\alpha_i = \alpha_{boundary\ i} + \alpha_{main\ i}(1 - \alpha_{boundary\ i})$, $\alpha_j = \alpha_{boundary\ j} + \alpha_{main\ j}(1 - \alpha_{boundary\ i})$ and $\alpha_k = \alpha_{boundary\ k} + \alpha_{main\ k}(1 - \alpha_{boundary\ k})$. In order to maintain color resolution when computing $C_i$, $C_j$ and $C_k$, their values are not multiplied by $\alpha_i$, $\alpha_j$ and $\alpha_k$ until computing the final color $C_f$. The result is the final frame of the interactive viewpoint video rendered from the desired viewpoint and ready for display to the user.

In the case where four neighboring viewpoints are employed and the desired viewpoint lies within the region defined by connecting the actual camera viewpoints, the blending is based on the computed weights ($w_i$, $w_j$, $w_k$, $w_l$) using the equation:

$$C_f = \frac{(w_i\alpha_iC_i + w_j\alpha_jC_j + w_k\alpha_kC_k + w_l\alpha_lC_l)}{(w_i\alpha_i + w_j\alpha_j + w_k\alpha_k + w_l\alpha_l)}$$

where $C_f$ is the final color. The alpha values $\alpha_i$, $\alpha_j$, $\alpha_k$ and $\alpha_l$ are computed as $\alpha_i = \alpha_{boundary\ i} + \alpha_{main\ i}(1 - \alpha_{boundary\ i})$, $\alpha_j = \alpha_{boundary\ j} + \alpha_{main\ j}(1 - \alpha_{boundary\ j})$, $\alpha_k = \alpha_{boundary\ k} + \alpha_{main\ k}(1 - \alpha_{boundary\ k})$ and $\alpha_l = \alpha_{boundary\ l} + \alpha_{main\ l}(1 - \alpha_{boundary\ l})$. In order to maintain color resolution when computing $C_i$, $C_j$, $C_k$ and $C_l$, their values are not multiplied by $\alpha_i$, $\alpha_j$, $\alpha_k$ and $\alpha_l$ until computing the final color $C_f$. Once again, the result is the final frame of the interactive viewpoint video rendered from the desired viewpoint and ready for display to the user.

In the case where the desired viewpoint lies on a line connecting two of the camera viewpoints, the blending is based on assigned weights (e.g., $w_i$, $w_j$) using the equation:

$$C_f = \frac{(w_i\alpha_iC_i + w_j\alpha_jC_j)}{(w_i\alpha_i + w_j\alpha_j)}$$

where $C_f$ is the final color. The alpha values $\alpha_i$ and $\alpha_j$ are computed as $a_i = \alpha_{boundary\ i} + \alpha_{main\ i}(1 - \alpha_{boundary\ i})$ and $\alpha_j = \alpha_{boundary\ j} + \alpha_{main\ j}(1 - \alpha_{boundary\ j})$. In order to maintain color resolution when computing $C_i$ and $C_j$, their values are not multiplied by $\alpha_i$ and $\alpha_j$ until computing the final color $C_f$. The result is the final frame of the interactive viewpoint video rendered from the desired viewpoint and ready for display to the user.

Figure 7:
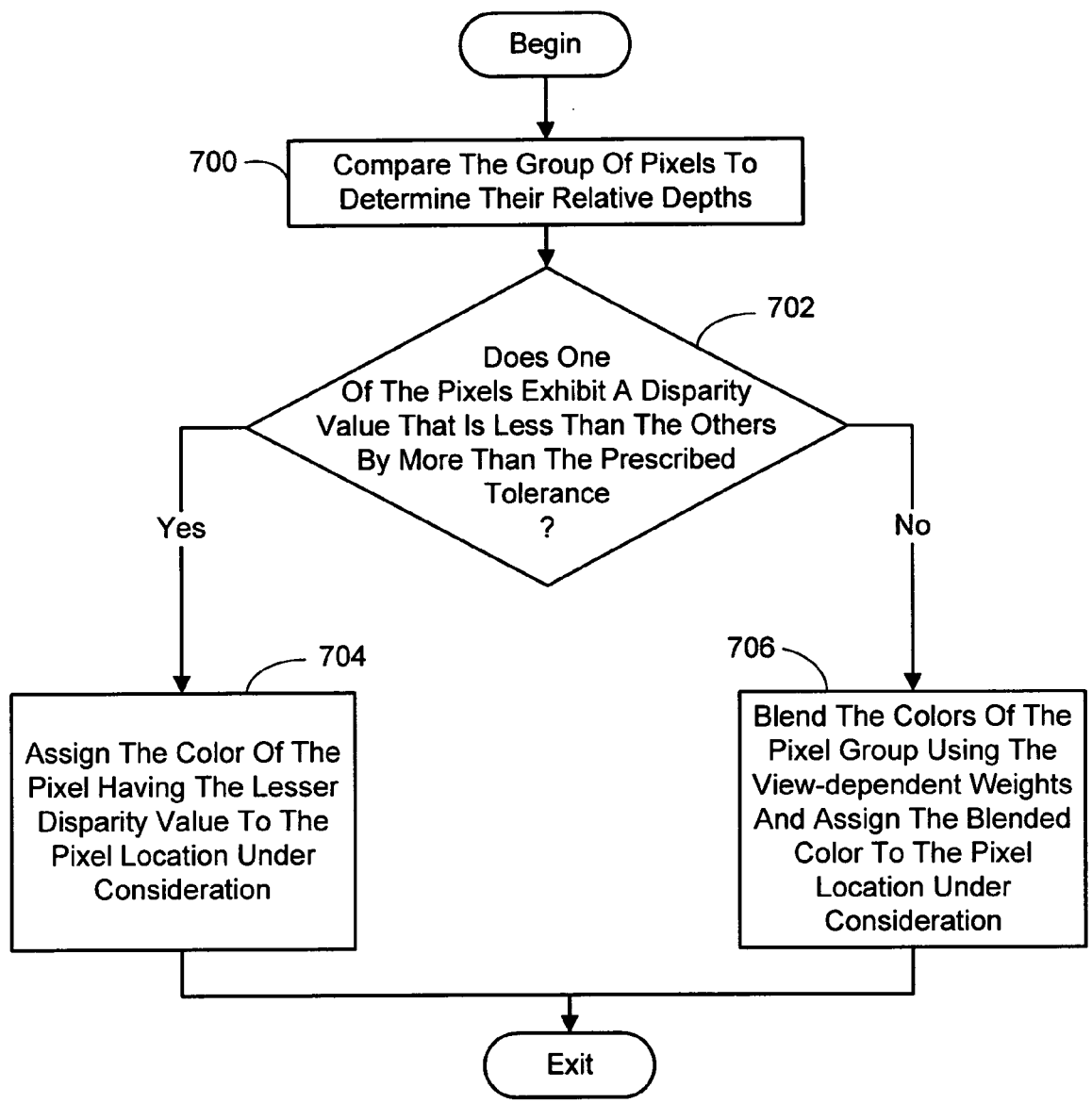
FIG. 7 is a flow chart diagramming a variation of the process of FIGS. 6A–B where a soft Z compare is employed in the blending portion thereof.

In a variation of the foregoing embodiment of the rendering process, a customized blending procedure is used. In this blending procedure, for each group of pixels to be blended, the shader performs a soft Z compare in order to compensate for noise in the depth estimates and re-projection errors. In essence, pixels that are sufficiently close together are blended using the view-dependent weights; for pixels that differ too much in depth, the front-most pixel is used. More particularly, referring to the process flow diagram of FIG. 7, this alternate blending procedure is outlined as it would be performed for each correspondingly located pixels in the composited images being blended. First, the group of pixels under consideration are compared to determine their relative depths (process action 700). It is next determined if one of the pixels in the group exhibits a disparity value that is less than the others by more than a prescribed tolerance (process action 702). In tested embodiments of the present invention, the prescribed tolerance was set to 4 disparity levels. If one of the pixels does have a disparity value that is less than the others by more than the prescribed tolerance, then that pixel's color value is assigned to the pixel location under consideration in the frame of the video currently being rendered (process action 704). Whereas, if the pixels exhibit disparity values that differ by an amount that is equal to or less than the prescribed tolerance, then the color value assigned to the pixel location under consideration in the frame of the video currently being rendered is blended from the pixels' color based on their view-dependent weights as described previously (process action 706). The normalization performed here is important since some pixels might only be visible or partially visible in one camera's view.

It is noted that in the foregoing soft Z compare blending procedure the pixel disparity values are still needed in order to perform the blending operation. However, a conventional shader program may not have access to a z-buffer of a GPU. Thus, if a GPU is employed in the rendering process, rather than storing the depth map in the GPU's z-buffer, the disparity values associated with the composited version of each view can be stored in a separate buffer to facilitate access by the shader program. It would be advantageous if future generations of GPUs allowed shader access to the hardware depth values. If this was possible, the current invention could be implemented more efficiently.

Figure 8A:
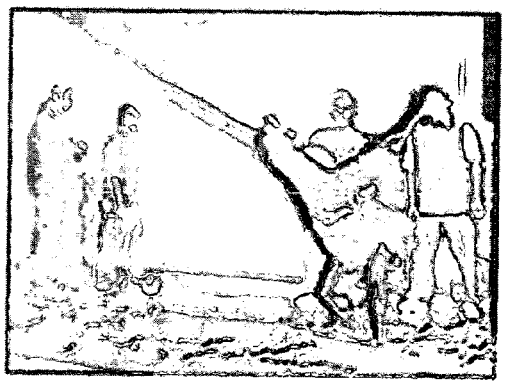
FIGS. 8(a)–(d) are a series of images showing an example of the intermediate and final stages of the foregoing rendering process.
Figure 8B:
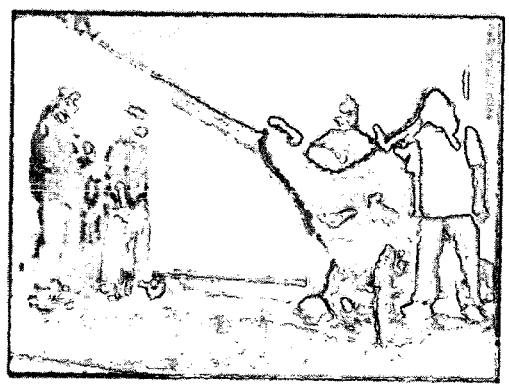
Figure 8C:
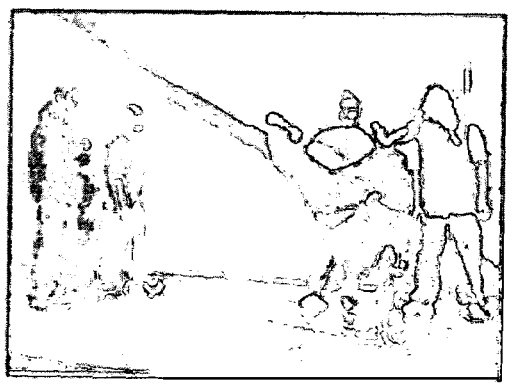
Figure 8D:
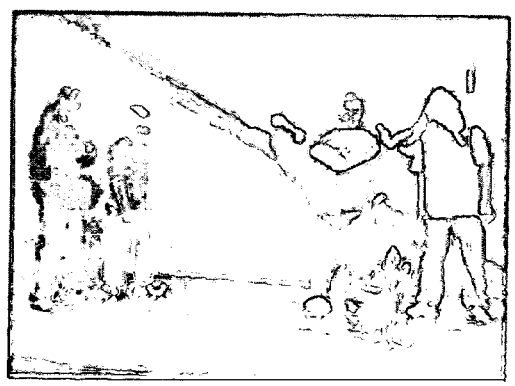

FIGS. 8(a)–(d) shows examples of the intermediate and final stages of the foregoing rendering process in the case where the desired viewpoint lies on a line connecting two of the camera viewpoints. FIG. 8(a) represents the rendered main layer of one camera view with the areas associated with depth discontinuities erased. FIG. 8(b) represents the composited main and boundary layers of this first view, whereas FIG. 8(c) represents the composited layers of the second view. Finally, FIG. 8(d) represents the final blended frame of the interactive viewpoint video. It can be seen from these images how the depth discontinuities are correctly erased, how the soft alpha-matted foreground elements are rendered, and how the final view-dependent blend produces high-quality results.

3.0 Potential Applications

The present interactive viewpoint video rendering system and process can be employed in a variety of interesting applications. At its basic level, a user is able to play a video and continuously change their viewpoint as they are watching. Thus, interactive viewpoint video allows users to experience video as an interactive 3D medium. This has a high potential for changing the way dynamic events are watched and enhancing realism of games. Examples of dynamic events of interest are sports events (baseball, basketball, skateboarding, tennis, etc.), instructional videos (how-to videos for golf, martial arts, etc.), and performances (Cirque de Soleil, ballet, modern dance, etc.). Further, if sufficient bandwidth is available, the video could be broadcast or multicast, thus providing a viewing experience that could be described as 3D television.

However, the present invention is not just limited to changing viewpoints while watching the video. It can also be used to produce a variety of special effects such as space-time manipulation. For example a user can freeze the video and view the depicted scene from a variety of viewpoints. A user can also play the video while viewing the depicted scene from one or more viewpoints, and then reverse the video and watch the scene from different viewpoints. Still further the video can be played forward or backward at any speed, while changing viewpoints as desired.

The foregoing features of interactive viewpoint are not only interesting to a casual viewer, but would be particularly useful to the television and film industry. Instead of the painstaking process of determining what part of a scene is to be captured and from what viewpoint ahead of time, with the possibility that most desirable shot would be missed, the system and process of the present invention can be used. For example, a scene would first be captured as an interactive viewpoint video. Then, the filmmaker can view the video and for each shot (even down to a frame-by-frame basis) chose the viewpoint that is desired for the final film. Further, the previously described object insertion feature is also a tool that could be advantageous to the filmmaker. Thus, the techniques presented bring us one step closer to making image-based (and video-based) rendering an integral component of future media authoring and delivery.

4.0 REFERENCES

[1] Buehler, C., Bosse, M., McMillan, L., Gortler, S. J., and Cohen, M. F. 2001. Unstructured lumigraph rendering. *Proceedings of SIGGRAPH* 2001 (August), 425–432.

[2] Carceroni, R. L., and Kutulakos, K. N. 2001. Multi-view scene capture by surfel sampling: From video streams to non-rigid 3D motion, shape and reflectance. In *Eighth International Conference on Computer Vision (ICCV* 2001), vol. II, 60–67.

[3] Carranza, J., Theobalt, C., Magnor, M. A., and Seidel, H.-P. 2003. Free-viewpoint video of human actors. *ACM Transactions on Graphics* 22, 3 (July), 569–577.

[4] Debevec, P. E., Taylor, C. J., and Malik, J. 1996. Modeling and rendering architecture from photographs: A hybrid geometry- and image-based approach. *Computer Graphics (SIGGRAPH'96)* (August), 11–20.

[5] Debevec, P. E., Yu, Y., and Borshukov, G. D. 1998. Efficient view-dependent image-based rendering with projective texture-mapping. *Eurographics Rendering Workshop* 1998, 105–116.

[6] Gortler, S. J., Grzeszczuk, R., Szeliski, R., and Cohen, M. F. 1996. The Lumigraph. In *Computer Graphics (SIGGRAPH'96) Proceedings*, ACM SIGGRAPH, 43–54.

[7] Hall-Holt, O., and Rusinkiewicz, S. 2001. Stripe boundary codes for real-time structured-light range scanning of moving objects. In *Eighth International Conference on Computer Vision (ICCV* 2001), vol. II, 359–366.

[8] Heigl, B., et al. 1999. Plenoptic modeling and rendering from image sequences taken by hand-held camera. In *DAGM'99*, 94–101.

[9] Kanade, T., Rander, P. W., and Narayanan, P. J. 1997. Virtualized reality: constructing virtual worlds from real scenes. *IEEE MultiMedia Magazine* 1, 1 (January–March), 34–47.

[10] Levoy, M., and Hanrahan, P. 1996. Light field rendering. In *Computer Graphics (SIGGRAPH'96) Proceedings*, ACM SIG-GRAPH, 31–42.

[11] Pulli, K., et al. 1997. View-based rendering: Visualizing real objects from scanned range and color data. In *Proceedings of the 8th Eurographics Workshop on Rendering*.

[12] Scharstein, D., and Szeliski, R. 2002. A taxonomy and evaluation of dense two-frame stereo correspondence algorithms. *International Journal of Computer Vision* 47, 1 (May), 7–42.

[13] Seitz, S. M., and Dyer, C. M. 1997. Photorealistic scene reconstruction by voxel coloring. In *Conference on Computer Vision and Pattern Recognition (CVPR'97)*, 1067–1073.

[14] Shade, J., Gortler, S., He, L.-W., and Szeliski, R. 1998. Layered depth images. In *Computer Graphics (SIGGRAPH'98) Proceedings*, ACM SIGGRAPH, Orlando, 231–242.

[15] Tao, H., Sawhney, H., and Kumar, R. 2001. A global matching framework for stereo computation. In *Eighth International Conference on Computer Vision (ICCV 2001)*, vol. I, 532–539.

[16] Vedula, S., Baker, S., Seitz, S., and Kanade, T. 2000. Shape and motion carving in 6D. In *Conference on Computer Vision and Pattern Recognition (CVPR'2000)*, vol. II, 592–598.

[17] Wilburn, B., Smulski, M., Lee, H. H. K., and Horowitz, M. 2002. The light field video camera. In *SPIE Electronic Imaging: Media Processors*, vol. 4674, 29–36.

[18] Yang, J. C., Everett, M., Buehler, C., and McMillan, L. 2002. A real-time distributed light field camera. In *Eurographics Workshop on Rendering*, P. Debevec and S. Gibson, Eds., 77–85.

[19] Zhang,Y., and Kambhamettu, C. 2001. On 3D scene flow and structure estimation. In *Conference on Computer Vision and Pattern Recognition (CVPR'2001)*, vol. II, 778–785.

[20] Zhang, L., Curless, B., and Seitz, S. M. 2003. Spacetime stereo: Shape recovery for dynamic scenes. In *Conference on Computer Vision and Pattern Recognition*, 367–374.

[21] J. Warren. Barycentric coordinates for convex polytopes. Advances in Computational Mathematics, Vol. 6, No. 2, 1996, pages 97–108.

Wherefore, what is claimed is:

1. A computer-implemented process for rendering and displaying a frame of an interactive viewpoint video, comprising using a computer to perform the following process actions:

identifying a current user-specified viewpoint;

identifying a frame or frames from a group of contemporaneously captured video frames depicting a portion of the same scene and corresponding with a current temporal portion of the interactive viewpoint video being rendered that are needed to render the scene depicted therein from the identified viewpoint, wherein each of said group of video frames was captured from a different viewpoint in a grid of viewpoints;

inputting layered representations of each identified video frame comprising, a main layer comprising background color and background disparity values of pixels found within predetermined sized areas in the frame surrounding pixels exhibiting depth discontinuities exceeding a prescribed threshold, and color and disparity values of pixels found outside said areas, and a boundary layer comprising foreground color, foreground disparity and alpha values of pixels found within said areas;

rendering the frame of the interactive viewpoint video from the viewpoint currently specified by the user using the inputted layered frame representations and displaying the rendered frame.

2. The process of claim 1, wherein the process action of identifying a frame or frames from the group of contemporaneously captured video frames, comprises the actions of:

inputting calibration data comprising geometric parameters associated with the capture of each identified video frame;

using the calibration data to determine the viewpoints associated with each of the video frames from which the layer representations were generated;

whenever the identified viewpoint coincides with a viewpoint of one of the video frames from which the layer representations were generated, identifying that frame as the only frame needed to render the scene;

whenever the identified viewpoint falls within a region demarcated by lines connecting the viewpoints of a prescribed number of the video frames from which the layer representations were generated which are closest to the identified viewpoint, all of these neighboring frames are identified as the frames needed to render the scene; and whenever the identified viewpoint falls on a line connecting the viewpoints of a pair of said prescribed number of the video frames from which the layer representations were generated which are closest to the identified viewpoint, the pair of neighboring frames are identified as the frames needed to render the scene.

3. The process of claim 2, wherein the prescribed number of the video frames is either three or four.

4. The process of claim 2, wherein the process action of rendering the frame of the interactive viewpoint video whenever the identified viewpoint coincides with a viewpoint of one of the video frames from which the layer representations were generated, comprises an action of compositing the boundary layer over the main layer using the alpha values from the boundary layer.

5. The process of claim 2, wherein the process action of rendering the frame of the interactive viewpoint video whenever the identified viewpoint falls within a region demarcated by lines connecting the viewpoints of a prescribed number of the video frames from which the layer representations were generated which are closest to the identified viewpoint and whenever the identified viewpoint falls on a line connecting the viewpoints of a pair of said prescribed number of the video frames from which the layer representations were generated which are closest to the identified viewpoint, comprises the actions of:

for each identified frame in turn, projecting the main layer of the frame to a virtual view corresponding to the current user-specified viewpoint, and projecting the boundary layer of the frame to the virtual view corresponding to the current user-specified viewpoint; and combining the projected layers to create a finalized frame of the interactive viewpoint video.

6. The process of claim 5, wherein the process action of combining the projected layers, comprises the actions of:

for each main and boundary layer associated with the same frame, compositing the boundary layer over the main layer using the alpha values of the layers;

assigning a view-dependent weight to each composited layer pair which is in direct proportion to how close the viewpoint associated with the layers used to create the composited layer pair is to the current user-specified viewpoint; and blending the composited layer pairs based on their assigned weights.

7. The process of claim 5, wherein the process action of combining the projected layers, comprises the actions of:

for each main and boundary layer associated with the same frame, compositing the boundary layer over the main layer using the alpha values of the layers;

assigning a view-dependent weight to each composited layer pair which is in direct proportion to how close the viewpoint associated with the layers used to create the composited layer pair is to the current user-specified viewpoint; and blending the composited layer pairs based on their relative disparity values and said assigned weights.

8. The process of claim 1, wherein the video frame data is compressed, and wherein process action of inputting the layered representations of the identified video frame or frames, comprises an action of decoding the portion of the video frame data necessary to obtain the layered representations of the identified video frame or frames.

9. A computer-readable medium having computer-executable instructions for performing the process actions recited in claim 1.

10. A system for rendering and displaying an interactive viewpoint video, said system comprising:
 a user interface sub-system for inputting user viewpoint selections and displaying rendered interactive viewpoint video frames to the user, comprising,
  an input device employed by the user to input viewpoint selections,
  a display device for displaying the rendered interactive viewpoint video frames to the user;
 a general purpose computing device;
 a computer program having program modules executable by the general purpose computing device, said modules comprising,
  a selective decoding module which decodes specified data associated with the layered representations of video frames for each frame of the interactive viewpoint video to be rendered and displayed,
  a rendering module which for each frame of the interactive viewpoint video being rendered and displayed,
   identifies the current user-selected viewpoint;
   specifies to the selective decoding module which frame or frames from a group of contemporaneously captured frames depicting a portion of the same scene and corresponding with a current temporal portion of the interactive viewpoint video being rendered and displayed, are needed to render the scene depicted therein from the identified viewpoint, wherein each of said group of video frames was captured from a different viewpoint in a grid of viewpoints;
   obtains the decoded frame data from the selective decoding module, said frame data comprising layered representations of each identified video frame comprising,
    a main layer comprising background color and background disparity values of pixels found within pre-determined sized areas in the frame surrounding pixels exhibiting depth discontinuities exceeding a prescribed threshold, and color and disparity values of pixels found outside said areas, and
    a boundary layer comprising foreground color, foreground disparity and alpha values of pixels found within said areas; and
   renders the frame of the interactive viewpoint video from the viewpoint currently selected by the user using the decoded frame data.

11. The system of claim 10, wherein the user interface sub-system further comprises a graphic user interface that allows the user to graphically indicate the viewpoint, among the possible viewpoints, from which it is desired to view the scene.

12. The system of claim 10, wherein the program module for specifying the frame or frames needed to render the scene depicted therein from the identified viewpoint, comprises sub-modules for:
 inputting calibration data comprising location and viewpoint information for each video camera used to capture each identified video frame for the selective decoding module;
 using the calibration data to determine the viewpoints associated with each of the video frames from which the layer representations were generated;
 whenever the identified viewpoint coincides with a viewpoint of one of the video frames from which the layer representations were generated, specifying that frame as the only frame needed to render the scene;
 whenever the identified viewpoint falls within a region demarcated by lines connecting the viewpoints of a prescribed number of the video frames from which the layer representations were generated which are closest to the identified viewpoint, all of these neighboring frames are identified as the frames needed to render the scene; and
 whenever the identified viewpoint falls on a line connecting the viewpoints of a pair of said prescribed number of the video frames from which the layer representations were generated which are closest to the identified viewpoint, the pair of neighboring frames are identified as the frames needed to render the scene.

13. The system of claim 12, wherein the program module for rendering the frame of the interactive viewpoint video whenever the identified viewpoint coincides with a viewpoint of one of the video frames from which the layer representations were generated, comprises sub-modules for:
 converting the main and boundary layer disparity values to depth values to produce a separate depth map for each layer;
 producing a 3D mesh for the main layer from its depth map;
 applying the pixel colors of the main layer to the main layer mesh to produce a texture map for the main layer;
 applying the pixel depths from the main layer depth map to the main layer mesh to produce a depth texture for that layer;
 identifying the locations of depth discontinuities associated with said one video frame that exceed a prescribed threshold;
 replacing mesh elements that cross over said depth discontinuity locations with transparent mesh elements which are assigned a zero-alpha color;
 producing a 3D mesh for the boundary layer from its depth map;
 applying the pixel colors of the boundary layer to the boundary layer mesh to produce a texture map for the boundary layer;
 applying the pixel depths from the boundary layer depth map to the boundary layer mesh to produce a depth texture for that layer; and
 compositing the boundary layer mesh over the main layer mesh using the alpha values from the boundary layer.

14. The system of claim 12, wherein the program module for rendering the frame of the interactive viewpoint video whenever the identified viewpoint falls within a region demarcated by lines connecting the viewpoints of a prescribed number of the video frames from which the layer representations were generated which are closest to the identified viewpoint and whenever the identified viewpoint falls on a line connecting the viewpoints of a pair of said prescribed number of the video frames from which the layer representations were generated which are closest to the identified viewpoint, comprises sub-modules for:

for each of the identified frames in turn,
projecting the main layer of the frame to a virtual view corresponding to the current user-specified viewpoint;
projecting the boundary layer of the frame to the virtual view corresponding to the current user-specified viewpoint; and
combining the projected layers to create a finalized frame of the interactive viewpoint video.

15. The system of claim 14, further comprising:
sub-modules, executed prior to projecting the main layer of each identified frame to the virtual view, for,
converting the main layer disparity values to depth values to produce a depth map of the layer,
producing a 3D mesh from the depth map,
applying the pixel colors of the main layer to the mesh to produce a texture map for the layer, and
applying the pixel depths from the depth map to the mesh to produce a depth texture; and
sub-modules, executed after projecting the main layer of each identified frame to the virtual view, for,
identifying the locations of depth discontinuities in the depth texture of the projected main layer that exceed a prescribed threshold; and
re-rendering mesh elements that cross over said depth discontinuity locations with transparent mesh elements which are assigned a zero-alpha color.

16. The system of claim 15, wherein prior to projecting the boundary layer of each identified frame to the virtual view, executing sub-modules for:
converting the boundary layer disparity values to depth values to produce a depth map of the boundary layer under consideration;
producing a 3D mesh from the boundary layer depth map;
applying the pixel colors of the boundary layer to the mesh to produce a texture map for the boundary layer under consideration; and
applying the pixel depths from the boundary layer depth map to the mesh to produce a depth texture.

17. The system of claim 16, wherein the sub-module for combining the projected layers, comprises sub-modules for:

for each boundary layer and main layer mesh associated with the same frame, compositing the boundary layer mesh over the main layer mesh using the alpha values of the layers;
assigning a view-dependent weight to each composited layer pair which is in direct proportion to how close the viewpoint associated with the layers used to create the composited layer pair is to the current user-specified viewpoint; and
blending the composited layer pairs based on their assigned weights.

18. The system of claim 16, wherein the sub-module for combining the projected layers, comprises sub-modules for:
for each boundary layer and main layer mesh associated with the same frame, compositing the boundary layer mesh over the main layer mesh using the alpha values of the layers;
assigning a view-dependent weight to each composited layer pair which is in direct proportion to how close the viewpoint associated with the layers used to create the composited layer pair is to the current user-specified viewpoint; and
blending the correspondingly located pixels of the composited layer pairs based on their relative disparity values and said assigned weights.

19. The system of claim 10, wherein the data associated with the layered representations of video frames of the interactive viewpoint video is compressed, and wherein the program module for decoding specified data associated with the layered representations of video frames for each frame of the interactive viewpoint video to be rendered and displayed, comprises a sub-module for decompressing just the portion of the video frame data necessary to obtain the layered representations of the identified video frame or frames.

20. The system of claim 10, wherein the general purpose computing device comprises a graphics processing unit (GPU) and a central processing unit (CPU), and wherein the program module for rendering a frame of the interactive viewpoint video comprises employing said GPU and CPU in concert so as to minimize the time required to render each frame.

* * * * *